United States Patent
Blease et al.

(10) Patent No.: US 11,413,896 B2
(45) Date of Patent: Aug. 16, 2022

(54) DIGITAL TEXTILE PRINTING INKS HAVING ZERO VOLATILE ORGANIC COMPOUND SOLVENTS THEREIN

(71) Applicant: International Imaging Materials, Inc., Amherst, NY (US)

(72) Inventors: James West Blease, Avon, NY (US); Timothy Michael Chewens, Buffalo, NY (US); Lianhui Cong, Bedford, NH (US); Daniel Jude Harrison, Pittsford, NY (US); John Richard Przybylo, Amherst, NY (US)

(73) Assignee: International Imaging Materials, Inc., Amherst, NY (US)

( * ) Notice: Subject to any disclaimer, the term of this patent is extended or adjusted under 35 U.S.C. 154(b) by 62 days.

(21) Appl. No.: 16/951,197

(22) Filed: Nov. 18, 2020

(65) Prior Publication Data
US 2022/0153047 A1    May 19, 2022

(51) Int. Cl.
*B41M 5/00*    (2006.01)
*B41J 11/00*    (2006.01)
*C09D 11/102*    (2014.01)

(52) U.S. Cl.
CPC .......... *B41M 5/0023* (2013.01); *B41J 11/002* (2013.01); *C09D 11/102* (2013.01)

(58) Field of Classification Search
CPC .... B41J 3/4078; B41J 11/0015; B41J 11/002; C09D 11/322; C09D 11/037; C09D 11/033; C09D 11/54; C09D 11/102; D06P 3/52; D06P 5/002; D06P 1/5285; D06P 1/5292; D06P 1/44; D06P 5/30; B41M 5/0064; B41M 5/0017; B41M 5/0023
See application file for complete search history.

(56) References Cited

U.S. PATENT DOCUMENTS

| | | | |
|---|---|---|---|
| 4,154,711 A | 5/1979 | Gandurin et al. |
| 4,285,690 A | 8/1981 | North |
| 4,345,063 A | 8/1982 | North |
| 4,457,980 A | 7/1984 | Daniels et al. |

(Continued)

FOREIGN PATENT DOCUMENTS

| | | |
|---|---|---|
| EP | 0121083 | 10/1984 |
| EP | 0277361 | 8/1988 |

(Continued)

OTHER PUBLICATIONS

International Search Report and Written Opinion for PCT/US2021/049824 (dated Feb. 3, 2022) dated Feb. 3, 2022.

(Continued)

*Primary Examiner* — An H Do (57) ABSTRACT

An ink, having a viscosity of 2.5 to 15 centipoise at 25° C., for textile printing includes pigment; a water dispersible anionic polymeric resin; a water soluble zero volatile organic compound solvent with a boiling point of 250° C. or greater; a crosslinking agent; and water. The water dispersible polymeric resin has particles with a median volume weighted size of less than 150 nm and a $95^{th}$ percentile volume weighted size of less than 250 nm. The water dispersible polymeric resin has an acid number value of 5 to 40, a resin film elongation of 500 to 1200%, and a film tensile strength of 10 to 60 mPa.

19 Claims, 1 Drawing Sheet

(56) References Cited

U.S. PATENT DOCUMENTS

| | | | |
|---|---|---|---|
| 4,597,794 | A | 7/1986 | Ohta et al. |
| 4,702,742 | A | 10/1987 | Iwata et al. |
| 4,888,093 | A | 12/1989 | Dean et al. |
| 5,085,698 | A | 2/1992 | Ma et al. |
| 5,348,997 | A | 9/1994 | Kato et al. |
| 5,360,933 | A | 11/1994 | Imashiro et al. |
| 5,389,133 | A | 2/1995 | Gundlach et al. |
| 5,432,229 | A | 7/1995 | Aoki et al. |
| 5,596,047 | A | 1/1997 | Wu et al. |
| 5,853,859 | A | 12/1998 | Levy et al. |
| 5,958,561 | A | 9/1999 | Held |
| 6,019,828 | A | 2/2000 | Rehman |
| 6,063,922 | A | 5/2000 | Flood et al. |
| 6,124,398 | A | 9/2000 | Imashiro et al. |
| 6,146,769 | A | 11/2000 | Anton |
| 6,432,186 | B1 | 8/2002 | Taniguchi |
| 6,443,569 | B1 | 9/2002 | Mheidle et al. |
| 7,119,160 | B2 | 10/2006 | Kodama et al. |
| 7,381,347 | B2 | 6/2008 | Jacobs, III et al. |
| 7,425,062 | B2 | 9/2008 | Bauer |
| 8,287,112 | B2 | 10/2012 | Van Thillo et al. |
| 8,328,340 | B2 * | 12/2012 | Ogawa ............ D06P 5/30 347/100 |
| 8,784,508 | B2 | 7/2014 | Ellis |
| 9,238,742 | B2 | 1/2016 | Fu et al. |
| 9,580,613 | B2 | 2/2017 | Oriakhi |
| 9,611,401 | B2 | 4/2017 | Mozel et al. |
| 9,783,693 | B2 | 10/2017 | Oriakhi |
| 9,845,400 | B2 | 12/2017 | Herlihy et al. |
| 10,995,230 | B2 * | 5/2021 | Yamazaki ............ C09D 11/54 |
| 11,053,406 | B2 * | 7/2021 | Hayashi ............ D06P 1/44 |
| 2003/0160851 | A1 | 8/2003 | Baccay et al. |
| 2004/0116558 | A1 | 6/2004 | Schutyser et al. |
| 2005/0174412 | A1 | 8/2005 | Codos et al. |
| 2005/0197419 | A1 | 9/2005 | Graziano et al. |
| 2006/0210719 | A1 | 9/2006 | Smith |
| 2007/0060670 | A1 | 3/2007 | Ellis |
| 2007/0148128 | A1 | 6/2007 | Kennedy et al. |
| 2008/0092309 | A1 | 4/2008 | Ellis et al. |
| 2009/0098312 | A1 * | 4/2009 | Goto ............ B41J 2/17553 427/256 |
| 2010/0214352 | A1 | 8/2010 | Tsunoda et al. |
| 2012/0306976 | A1 | 12/2012 | Kitagawa et al. |
| 2013/0155162 | A1 | 6/2013 | Ohtsuka |
| 2017/0022379 | A1 | 1/2017 | Loccufier et al. |
| 2017/0218565 | A1 | 8/2017 | Loccufier |
| 2018/0105710 | A1 | 4/2018 | Hong et al. |
| 2018/0118963 | A1 | 5/2018 | Xu et al. |
| 2020/0002561 | A1 | 1/2020 | Hayashi et al. |

FOREIGN PATENT DOCUMENTS

| | | |
|---|---|---|
| EP | 1144755 B1 | 10/2001 |
| EP | 3156462 A1 | 4/2017 |
| WO | WO2004090005 | 10/2004 |
| WO | WO2016164220 | 10/2016 |
| WO | WO2018049327 | 3/2018 |
| WO | WO2020006022 | 1/2020 |

OTHER PUBLICATIONS

Colloids and Surfaces a: Physiochemicaland Engineering Aspects,Elsevier, Amsterdam, NL, Guan Yu et al:"Preparation of UV-cured pigment/latex dispersion for textile inkjet printing",vol. 462,Sep. 6, 2014 (Sep. 6, 2014), pp. 90-98. Sep. 6, 2014.

Database WPI Week 199617 Thomson Scientific, London, GB; XP002794866, & JPH0848922A (Teikoku Ink Seizo KK) abstract Feb. 2, 1996.

International Search Report and Written Opinion for PCT/US2019/039140 dated Oct. 21, 2019.

English Translation of Japanese Patent No. 3040668 B2 Mar. 3, 2000.

Preliminary Report on Patentability for PCT/US2019/039140, dated Jan. 7, 2021.

Database WPI Week 199617 Thomson Scientific, London, GB; XP002794866, & JPH0848922A (Tekkoku Ink Seizo KK) abstract Feb. 2, 1996.

* cited by examiner

DIGITAL TEXTILE PRINTING INKS HAVING ZERO VOLATILE ORGANIC COMPOUND SOLVENTS THEREIN

BACKGROUND

Textile printing is the process of applying color, patterns, and designs to a fabric. In this process colorants (dyes or pigments) are applied to the fabric in an image wise fashion. These printed colorants should be strongly bound to the fibers, which make up the fabric, to preserve the quality of the printed image during the life of the textile. In the case of dye based inks, the fibers take up and hold the dye. However, dyes are subject to fade by photo and/or chemical oxidation over time, leading to color bleaching.

Pigments are very resistant to such fading mechanisms enabling bleach-resistant textiles to be printed. However, without a vehicle, pigments are not able to bond to the fibers and are quickly removed from the fabric by washing or mechanical abrasion. To bond the pigments to the fibers, polymeric binders are used.

Textiles are supplied in a wide variety of colors ranging from white, to pastels, to saturated colors, to black. Inkjet inks are comprised of subtractive primary colors such as yellow, magenta, and cyan, which, when combined by overprinting, can generate a nearly infinite range of process colors. However, combining subtractive primary colors with good fidelity requires a white or nearly white background. When the textile itself is not white subtractive process color printing is distorted, and in the extreme, when printing on black textiles, it is difficult to produce any color fidelity.

To solve this problem white inkjet inks have been developed to print a white background layer onto color substrates to enable subtractive process color printing.

U.S. Pat. Nos. 9,580,613 and 9,783,693 disclose white inkjet inks for printing onto colored substrates. The entire contents of U.S. Pat. Nos. 9,580,613 and 9,783,693 are hereby incorporated by reference.

Textiles are comprised of natural and synthetic fibers. These fibers are often hydroxyl-containing materials. Cellulosic fiber materials consist wholly or partly of cellulose and or chemically modified cellulose. Examples are natural fiber materials such as cotton, linen, hemp, wool or silk and regenerated fiber materials such as viscose and rayon. Synthetic fibers include polyacrylates, polyesters, polyacrylonitrile, polyamide, aramid, polypropylene, and polyurethane. The fiber materials mentioned are preferably present as sheet-like textile wovens, knits, or webs.

In the textile printing process, pigmented inks are printed onto the surface of the fabric. Depending upon the physical properties of the ink and the surface chemistry on the fibers, some fraction of the ink will penetrate into the fabric. As the ink is dried on the fabric, these binders serve as an adhesive to bond the pigments to the fibers. While ink penetration into the fabric may enhance print durability, ink penetration may also stiffen the fabric by bonding the fibers together. Additionally, the covering power of the ink, especially over dark fabrics, is diminished by the penetration of ink into the fabric. It is desirable to print and dry pigmented textile inks onto the surface of the fabric and minimize penetration of ink into the fabric.

Printing textiles with pigmented inks is well known in the art; see for example, U.S. Pat. Nos. 4,154,711; 4,457,980; and 5,853,859. The entire contents of U.S. Pat. Nos. 4,154,711; 4,457,980; and 5,853,859 are hereby incorporated by reference.

Seamless rotary screen printing of textiles was introduced in 1963. This analog printing process still dominates textile printing production with high market share. The process is able to print high solids, high viscosity inks onto textiles at fast production speeds. Multiple colored inks can be printed, one atop the other, to build up intricate patterns and designs. Such analog printing methods are very productive and the printed textiles analog printing methods produce have very good durability.

Published US Patent Application Number 2003/0160851 discloses that the printing of textiles is accomplished primarily by rotary screen methods. In operation, screen printing is rapid, and for large runs, cost effective. The entire content of Published US Patent Application Number 2003/0160851 is hereby incorporated by reference.

Analog printing technologies require different rotary screens for each design and component color. This requires an investment in tooling for each design, changeover time to replace the screens from one design to another, and space to inventory all the screens in active use at the printing facility. Creating screens is expensive and time consuming, thus making the per-unit cost for short runs quite substantial and, in many cases, prohibitive. For custom designs and patterns and/or short textile printing runs, digital printing offers economic and operational advantages over analog printing methods.

For the digital printing of textiles, changeover time from image to image is essentially eliminated as each digital image file may be quickly loaded into the printer, eliminating the need to change analog printing screens or plates. Color adjustments can be made on the fly not requiring the ink to be changed out.

Digital printing eliminates the set up expense associated with screen preparation and can potentially enable cost-effective short run production. Digital inkjet printing furthermore allows visual effects such as tonal gradients and infinite pattern repeat size that cannot be practically achieved by a screen printing process.

Inkjet printing is not capable of printing high viscosity inks such as those inks used in rotary screen printing of textiles. In fact, most inkjet printers require inks with viscosities in the range of 2-20 cps. In contrast, rotary screen inks can have viscosities greater than 1000 cps.

Consequently, inkjet inks are quite limited in the amount of polymeric binder which can be incorporated in the ink to bond the pigment to the fibers, a limitation not shared with screen printing inks. Rotary screen inks contain high loadings of both pigments and polymeric binders. This allows for a very thin ink layer to be printed onto the surface of the fabric. Because screen inks are so high in viscosity, the ink bonds to the surface of the textile but does not penetrate down into the textile.

After drying the screened inks on the textile, the print is durable because the high polymeric resin loading bonds the pigment to the textile fibers and the printed textile remains soft because the printed image is concentrated in a thin surface layer. Additionally, since the ink does not penetrate through the bulk of the fabric, there is little opportunity for the polymeric resin to create adhesive bonds between the fibers which can stiffen the textile.

Fiber and textile pre-printing treatments, commonly called "pretreatments," were recognized early on as a means to improve the attachment of inkjet printed pigmented inks to the surface of the textile; see for example, U.S. Pat. Nos. 4,702,742 and 6,432,186. Published US Patent Application Number 2006/0210719 and U.S. Pat. No. 8,784,508 describe the use of ink jet to digitally print images onto the pretreated surface of textiles. The entire contents of U.S. Pat. Nos. 4,702,742; 6,432,186; Published US Patent Application Number 2006/0210719; and U.S. Pat. No. 8,784,508 are hereby incorporated by reference.

Fabric pretreatment helps to concentrate inkjet inks on the surface of the textile to prevent the ink from penetrating into the textile and to provide sufficient polymeric resin to bond the pigment to the surface of the textile, providing good durability and color strength. Pretreatments contain high concentrations of cationic salts. Digital textile inks contain binder resin particles which are anionically stabilized and capable of reacting with the cationic pretreated textile. Not wishing to be bound to any particular theory, it is believed that high cationic surface concentrations on the pretreated textile interact with the anionically stabilized resin particles in the digitally printed ink to cause a coagulation of such particles and subsequent rise in ink viscosity.

Various fabric pretreatment methods have been described; see for example, U.S. Pat. No. 5,958,561, which discloses an ink/textile combination wherein the textile is pretreated with a cross-linkable thermoplastic polymer and then imaged with an aqueous ink and cured at temperatures of 100-190° C. Improved wash fastness was obtained. The entire content of U.S. Pat. No. 5,958,561 is hereby incorporated by reference.

U.S. Pat. No. 6,146,769 discloses an ink/textile combination wherein an interactive polymer, in the ink or pretreated or on the textile, helps bind the particulate colorant and provide wash-fastness. The entire content of U.S. Pat. No. 6,146,769 is hereby incorporated by reference.

Published US Patent Application Number 2008/0092309 describes the utility of applying a cationic pretreatment to the surface of the textile to enhance the appearance and durability of an inkjet ink printed image. Published US Patent Application Number 2008/0092309 further describes that the pretreatments for the particular textile substrates include a nonionic latex polymer in order to further enhance the adhesion and/or wash fastness of ink colorants on the textile fabric substrates. The pretreated textiles, including a nonionic latex polymer, provide high color density and saturation relative to untreated textiles, superior print quality relative to untreated textiles, reduction of wicking or bleeding relative to untreated textiles, and enhanced ink absorption relative to untreated textiles. Furthermore, the pretreatment formulations provide enhanced wash fastness of a printed image when printing via an ink jet printing process. The entire content of Published US Patent Application Number 2008/0092309 is hereby incorporated by reference.

After printing, the inkjet printed textile is advantageously dried and cured, preferably at temperatures up to 170° C., especially 110 to 166° C. The drying and curing time can be between 30 seconds and 5 minutes, more preferably between 1 and 4 minutes.

It is known by those skilled in the art that in order to consistently eject ink from an ink jet print head, the physical properties of the inkjet ink are constrained by certain physical parameters namely the liquid density, liquid viscosity, liquid surface tension, and a characteristic dimension of the print head device namely the diameter of the print head nozzle orifice. The combination of the parameter values is described by the dimensionless inverse Ohnesorge number ($Oh^{-1}$) also known as the Z number and is defined as:

$$Z = \frac{(a\rho\gamma)^{1/2}}{\mu},$$

where a represents the nozzle diameter (the characteristic dimension), p represents the inkjet ink density, γ represents the ink surface tension and p represents the ink viscosity. The latter three parameters are determined at a fixed temperature. According to Derby and Reis (MRS Bulletin, 2003, 28, 815-818), a consistently printable inkjet ink should have a combination of the above physical properties to provide a Z value between 1 and 10.

It is well known in the art that inkjet inks should exhibit stable physical and chemical properties over time in order to be used successfully. One method of assessing the stability of inkjet inks is to store the inks at room temperature over an extended period of time, for example six months to two years or more while periodically sampling the inkjet inks for changes to properties such as pH, viscosity, surface tension, particle size distribution, and the like. However, extended storage at room temperature is inefficient and detrimental to rapid development of inkjet ink formulation.

For that reason, accelerated aging techniques are employed, primarily storing the inkjet inks at elevated temperatures ranging from for example 30° C. to 80° C. and assessing change to the inkjet ink properties over shorter periods of time for example on a weekly time interval. One commonly used temperature and time combination used by those skilled in the art is two weeks of storage at 60° C. Other commonly used combinations are four weeks at 60° C., six weeks at 60° C., and so forth.

In addition to inkjet ink comprising pigment and polymeric resin binders, the inks typically contain, among other additives, water miscible and/or water soluble organic solvents. In the following descriptions, solvents are defined as compounds which are either in the liquid state under ambient conditions or are in the solid state under ambient conditions and can be changed into the liquid state by dissolution into water. The function of the organic solvents can vary but primarily their purpose is to improve jetting performance from the inkjet print head and control ink interaction with the substrate onto which it is printed.

Regarding the ink-print head interaction, organic solvents act primarily as humectants and viscosity control aids to both reduce moisture loss from the inkjet ink composition enabling more reliable ink ejection and to modify the ink viscosity into a range suitable for consistent ink ejection from the print head. The organic solvents can also modify the interaction between the inkjet ink and the substrate affecting such characteristics as wetting, penetration and drying.

U.S. Pat. No. 5,085,698 discloses representative examples of water-soluble organic solvents that may be combined with water to form an aqueous vehicle for pigmented textile inkjet inks. Such mixtures of solvents and water are well known to those skilled in the art. The entire content of U.S. Pat. No. 5,085,698 is hereby incorporated by reference.

In selecting water miscible or water soluble organic solvents for use in an inkjet ink, the safety, toxicity, and environmental impact of the organic solvent vapors requires consideration. Along with water vapor, organic solvent vapors are inevitably generated during the inkjet ink printing process and especially during the drying/curing process. In the process step, depending on the particular organic solvent and drying/curing time and temperature, the organic solvent may be substantially vaporized.

It is well recognized that organic solvent vapors can pose a health and environmental hazard both external to the building in which inkjet printing of textiles is occurring and in particular the building interior where solvent vapors can reach substantially higher concentrations. Control of both internal and external solvent vapor emissions can be costly in terms of solvent vapor mitigation processes. In this regard it is desirable to select organic solvents for use in inkjet inks which minimize solvent vapor generation during printing and drying/curing.

Organic solvents can be classified based on characteristics such as their boiling point at a standard pressure or vapor pressure at a standard temperature. In this regard, the term volatile organic compound is used to describe organic solvents that meet a particular criterion. Organic solvents are widely recognized as a volatile organic compound if the organic solvents have a boiling point less than 250° C. measured at a standard atmospheric pressure of 101.3 kPa. World Patent WO2004090005A1 defines "volatile organic compound free" as compositions essentially not formulated with, or not comprising, chemical components that are considered volatile organic compounds as that term is known in the art, and as defined by United Stated Environmental Protection Agency Method 24.

A problem with many water-soluble organic solvents commonly used in inkjet inks is that many water-soluble organic solvents are classified as volatile organic compounds and the volatile organic compounds' emission into the environment upon drying of the ink is regulated in many countries. Thus, it is desirable to provide pigmented inkjet textile inks which are essentially free of volatile organic compounds.

Published United States Patent Application Number 2010/0214352 discloses water-soluble organic solvents having a solubility parameter value within a range from 10 to 15.5 (cal/cm) include organic compounds that are liquid at room temperature and soluble in water. Examples include lower monoalcohols such as methanol, ethanol. 1-propanol, isopropanol, 1-butanol, 2-butanol, isobutanol, and 2-methyl-2-propanol, all of which have boiling points below 250° C. The entire content of Published United States Patent Application Number 2010/0214352 is hereby incorporated by reference.

Published United States Patent Application Number 2018/0105710 discloses inkjet ink compositions comprised of water and one or more organic co-solvents, which can be water-soluble organic co-solvents, water-miscible organic co-solvents, or a combination thereof. The organic co-solvents can be added either alone or in combination. The organic co-solvents can be humectants, which reduce the rate of evaporation of the water component and prevent an ink composition from drying out or crusting in the nozzles of the printhead to minimize clogging of the nozzles. In embodiments, the organic co-solvents can enhance solubility of the components in the inkjet ink composition, and facilitate penetration of a printed ink composition into a substrate. Suitable water-soluble and water-miscible organic solvents include, but are not limited to, alcohols (e.g., methanol, ethanol, propanol, isopropyl alcohol, butanol, polyols, ethylene glycol, glycerol, and PEG, among others), ketones and ketone alcohols (e.g., acetone and diacetone alcohol, among others), ethers (e.g., tetrahydrofuran, dioxane, and alkylethers, among others), ethers of polyhydric alcohols (e.g., ethylene glycol monomethyl ether, ethylene glycol monoethyl ether, ethylene glycol monoethyl ether acetate, di(ethyleneglycol) monomethyl ether), nitrogen-containing solvents (e.g., 2-pyrrolidone, and N-methyl-2-pyrrolidone, among others), sulfur-containing solvents (e.g., 2,2'-thiodiethanol, dimethylsulfoxide, tetramethylene sulfone, and sulfolane, among others), and sugars and derivatives thereof (e.g., glucose, oxyethylene adducts of glycerin, and oxyethylene adducts of diglycerin, among others). Many of these organic solvents have boiling points below 250° C. The entire content of Published United States Patent Application Number 2018/0105710 is hereby incorporated by reference.

Other examples of inks for use in digital textile printing are disclosed in Published PCT Patent Application Number WO 2020/006022 A1. The entire content of Published PCT Patent Application Number WO 2020/006022 A1 is hereby incorporated by reference.

Digital textile printing has great potential to transform the printed textile and apparel industry, but the emissions of volatile organic compounds generated during printing, drying and curing processes needs to be eliminated. Digital textile printing must also be able to produce high fidelity process colors, even on darkly colored fabrics. In addition, digital textile printing should not stiffen the fabric, reduce the hand, or create unacceptable surface texture or feel. Furthermore, printed textile inks should also be free of harmful chemicals which could pose health issue related to skin contact.

Therefore, it is desirable to provide digital textile printing ink that is free of any volatile organic compounds.

Moreover, it is desirable to provide digital textile printing ink that is free of any volatile organic compounds and is able to produce high fidelity process colors, even on darkly colored fabrics.

Furthermore, it is desirable to provide digital textile printing ink that is free of any volatile organic compounds and that facilitates digital textile printing without stiffening the fabric, thereby reducing an unacceptable surface texture or feel.

Additionally, it is desirable to provide digital textile printing ink that is free of any volatile organic compounds and free of harmful chemicals which could pose health issue related to skin contact.

As noted above, it is desirable to provide inks for inkjet printing of textiles that comprises essentially no volatile organic compounds and are capable of printing high opacity white backgrounds with high fidelity subtractive primary over-printing, as well as providing a method for producing a printed item that uses these inks.

Additionally, it is desirable to provide an ink for inkjet printing comprising a pigment, a water-dispersible resin, water, and a water-soluble non-volatile organic compound solvent (water-soluble zero volatile organic compound solvent), wherein the water-dispersible resin particles have a median volume weighted size of less than 150 nm, a $95^{th}$ percentile volume weighted size of less than 250 nm, having film elongation of 500 to 1200%, film tensile strength of 10 to 60 mPa, an acid number value (mg KOH/g) of 5 to 40, and the viscosity of the ink at 25° C. is 2.5 to 15 cps.

Also, it is desirable to provide an ink for inkjet printing which contains 0 to 15 parts crosslinking agent per 100 parts of dry resin solids.

Furthermore, it is desirable to provide to an ink for inkjet printing which comprises a water dispersible anionic polymeric resin which is preferably a urethane resin and a water soluble non-volatile organic compound solvent (water-soluble zero volatile organic compound solvent) with a boiling point of 250° C. or greater. Preferable, the water soluble non-volatile organic compound solvent (water-soluble zero volatile organic compound solvent) is selected from the group of glycerol, diglycerol, triethylene glycol, tetraethylene glycol, 1,6-hexanediol, tripropylene glycol, triethylene glycol monobutyl ether, and 1-(2-hydroxyethyl)-2-pyrrolidone.

As disclosed below, an ink for inkjet printing (hereafter also referred to as simply "the ink") includes both inks in which the pigment is a white pigment (hereafter also referred to as "white ink"), and inks in which the pigment is a colored pigment other than white (hereafter also referred to as "colored ink" or "subtractive primary ink").

As disclosed below a method for producing the printed textile, comprises: (1) applying a pretreatment agent comprising a polyvalent metal salt to a printing location on an textile to be printed, and (2) printing the ink for inkjet printing using an inkjet recording method.

Printed and cured images on textiles produced with these inks provide good hand, feel, stiffness, and texture. Printed and cured images also have good wash fastness, and are resistant to fading and abrasion. These inks can easily fit into existing textile printing workflows and are cured within the usual drying ovens and presses typically employed in textile printing processes.

BRIEF DESCRIPTION OF THE DRAWINGS

The drawing is only for the purpose of illustrating an embodiment and is not to be construed as limiting, wherein:

DETAILED DESCRIPTION

Unless otherwise defined, all technical and scientific terms used herein have the same meaning as is commonly understood by one of skill in the art.

The ink is a composition comprising a pigment, water dispersible resin particles, water, and a non-volatile organic compound solvent (zero volatile organic compound solvent).

In the descriptions, the terms, "non-volatile organic compound solvent" and "zero volatile organic compound solvent," refer to an organic solvent that does not contain any volatile organic compounds therein such that no emissions of volatile organic compounds are generated during printing, drying, and/or curing processes of the ink.

Various colorants useful in inkjet inks are disclosed in U.S. Pat. No. 8,287,112. The entire content of U.S. Pat. No. 8,287,112 is hereby incorporated by reference.

At least one of the non-aqueous dispersed phases contains at least one colorant. Colorants used in inkjet inks may be pigments, dyes or a combination thereof. The term "dye", as used herein, means an colorant having a solubility of 10 mg/L or more in the aqueous phase in which it is applied and under the ambient conditions pertaining.

The inkjet textile inks preferably contain a pigment as colorant. Organic and/or inorganic pigments may be used in the non-aqueous dispersed phase of the inkjet textile ink. If the colorant is not a self-dispersible pigment, the inkjet ink preferably also contain a dispersant, more preferably a polymeric dispersant.

Pigments may be dispersed in the continuous aqueous phase of the inkjet textile ink by dispersing agents, such as polymeric dispersants or surfactants. Additionally, the surface of the pigments can be modified to obtain so-called "self-dispersible" or "self-dispersing" pigments, i.e. pigments that are dispersible in the dispersion medium without dispersants.

Pigment particles in inkjet ink should be sufficiently small to permit free flow of the ink through the inkjet-printing device, especially at the ejecting nozzles. It is also desirable to use small particles for maximum color strength and to slow down sedimentation.

When measured by a laser diffraction particle sizing apparatus such as the Horiba LA-950 and the like, the volume weighted median pigment particle size of a dispersed non-white pigment is preferably between 20 and 150 nm, more preferably between 50 and 150 nm. For the white pigment dispersion when measured by a laser diffraction particle sizing apparatus such as the Horiba LA-950 and the like, the volume weighed median pigment particle size of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

The pigment amount in the color inkjet inks is preferably at a concentration of 0.5 to 20 wt %, more preferably 1.0 to 15 wt % and most preferably 1.5 to 6.5 wt % based on the total weight of the inkjet ink. For white inkjet inks the pigment amount is preferably at a concentration of 5 to 25%, more preferably 8 to 20% and most preferably 10 to 15% based on the total weight of the inkjet ink.

The pigments in the color inkjet textile inks may be black, white, cyan, magenta, yellow, red, orange, violet, blue, green, brown, mixtures thereof, and the like. The color pigment may be chosen from those disclosed by HERBST, Willy, et al. Industrial Organic Pigments, Production, Properties, and Applications. 3rd edition. Wiley-VCH, 2004. ISBN 3527305769.

Preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 180, 185 and 213. More preferably, yellow pigments are C.I. Pigment Yellow 74, 128, 139, 150 155 and 213. Preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 270 and 272.

Preferred pigments are C.I. Pigment Violet 1, 2, 19, 23, 32, 37, and 39. Preferred pigments are C.I. Pigment Blue 15:1, 15:2, 15:3, 15:4, 15:6, 16, 56, 61, and (bridged) aluminum phthalocyanine pigments. Preferred pigments are C.I. Pigment Orange 5, 13, 16, 34, 40, 43, 59, 66, 67, 69, 71, and 73. Preferred pigments are C.I. Pigment Green 7 and 36. Preferred pigments are C.I. Pigment Brown 6 and 7. Suitable pigments include mixed crystals of the above particular preferred pigments.

Carbon black is preferred as a pigment for the black inkjet ink. Suitable black pigment materials include carbon blacks such as Pigment Black 7 (e.g. Carbon Black MA80 from MITSUBISHI CHEMICAL), REGAL® 400R, MOGUL® L, ELFTEX® 320 from CABOT Co., or Carbon Black FW18, Special Black 250, Special Black 350, Special Black 550, PRINTEX® 25, PRINTEX® 35, PRINTEX® 55, PRINTEX® 90, PRINTEX® 150T from DEGUSSA.

Additional examples of suitable pigments are disclosed in U.S. Pat. No. 5,389,133. Particular preferred pigments are C.I. Pigment White 1, 2, 3, 4, 5, 6, 7, 10, 11, 12, 14, 17, 18, 19, 21, 24, 25, 27, 28, and 32. The entire content of U.S. Pat. No. 5,389,133 is hereby incorporated by reference.

A preferred white pigment is Pigment White 6 or titanium dioxide. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one or mixtures of these are usable.

For surface treatment of the titanium oxide, an aqueous treatment or a gas phase treatment is applied, and an alumina-silica treating agent is usually employed. Untreated-, alumina treated-, alumina-silica treated- or chloride treated-titanium dioxide are employable. To further improve titanium dioxide dispersion stability dispersants can be employed. Example dispersants include polymeric dispersants such as Disperbyk-190 from BYK-Chemie GmbH.

It is also possible to make mixtures of pigments in the color inkjet inks. For some applications, a neutral black inkjet ink is preferred and can be obtained, for example, by mixing a black pigment and a cyan pigment into the ink. Also non-organic pigments may be present in the color inkjet inks. Particular preferred pigments Illustrative examples of the inorganic pigments include red iron oxide (III), cadmium red, ultramarine blue, Prussian blue, chromium oxide green, cobalt green, amber, titanium black and synthetic iron black.

Specific examples of commercially available pigment dispersions include Pro-Jet Cyan APD10000, Pro-Jet Magenta APD10000, Pro-Jet Yellow APD10000, Pro-Jet Yellow(LF) APD10000, Pro-Jet Black APD10000 from Fujifilm Imaging Colorants, Inc., Cab-O-Jet 200® black, Cab-O-Jet 250C® cyan, Cab-O-Jet 260M® magenta, Cab-O-Jet 265M® magenta, Cab-O-Jet 270® yellow, Cab-O-Jet 300® black, Cab-O-Jet 352® black, Cab-O-Jet 400® black, Cab-O-Jet 450C® cyan, Cab-O-Jet 465M® magenta, Cab-O-Jet 470Y® yellow, Cab-O-Jet 480V® violet, Cab-O-Jet 554B® blue, Cab-O-Jet 740Y® yellow, from Cabot Corporation, Specialty Cyan Dispersion Type A1®, Specialty Cyan Dispersion Type A1®, Specialty Cyan Dispersion Type A1®, Specialty Cyan Dispersion Type P10, Specialty Cyan Dispersion Type P2®, Specialty Magenta Dispersion Type A1®, Specialty Magenta Dispersion Type A2®, Specialty Magenta Dispersion Type A3®, Specialty Magenta Dispersion Type P10, Specialty Magenta Dispersion Type P3®, Specialty Yellow Dispersion Type A1®, Specialty Yellow Dispersion Type A2®, Specialty Yellow Dispersion Type P10, Specialty Yellow Dispersion Type P2®, Specialty Black Dispersion Type A1®, Specialty Black Dispersion Type P2®, Specialty Black Dispersion Type P4®, Specialty Black Dispersion Type SD2®, Specialty Black Dispersion Type SD4®, Specialty Red Dispersion Type P1®, Specialty Green Dispersion Type P1®, Specialty Green Dispersion Type P2®, Specialty Green Dispersion Type P3®, Specialty Green Dispersion Type P4®, Specialty Orange Dispersion Type P1®, Specialty Violet Dispersion Type P1®, Specialty White Dispersion Type P2®, from Eastman Kodak Company, Mega Cyan®, Mega Magenta®, Mega Yellow 2®, Mega Black®, DU 10100 cyan, DU 1020® magenta, DU 1030 Yellow®, DU 1031 Yellow®, DU 1040® black, DU 1041® black, from E. I. du Pont de Nemours and Company, Cylcojet Blue 15:3 Liquid®, Cylcojet Blue 15:0 & 15:4 Liquid®, Cylcojet Blue 60 Liquid®, Cylcojet Brown 25 Liquid®, Cylcojet Red 122 Liquid Blue Shade®, Cylcojet Red 122 Liquid Yellow Shade®, Cylcojet Black 7 Liquid®, Cylcojet Violet 19 Liquid Blue Shade®, Cylcojet Violet 19 Liquid Yellow Shade®, Cylcojet Yellow 74 & 155 Liquid, Cylcojet Orange 34 & 43, Cylcojet White 6 Liquid, from Lever Colors, Inc., Hostajet Yellow 4G-PT VP2669®, Hostajet Red D3G-PT VP 5152®, Hostajet Magenta E5B-PT VP3565®, Hostajet Magenta E7B-PT VP 5122®, Hostajet Magenta E-PT®, Hostajet Cyan BG-PT®, Hostajet Green 8G-PT VP 5154®, Hostajet Black O-PT®, from Clariant International, Ltd., Tint-Ayd® CW5003 white dispersion from Chromaflow Technologies, Varionyl 702® white dispersion from Prometho GmbH, and NovoColor IP 8500® white dispersion from Engineered Polymers Solution & Color Corporation of America.

The inkjet ink for textile printing comprises anionic water dispersible resin particles. The polymeric resin is dispersed in the aqueous phase in the form of particles otherwise known as emulsion, dispersion, or latex form resin polymer. The water-dispersible resin that acts as a pigment binder comprises at least an anionic resin having properties of a median volume weighted size of less than 150 nm, a $95^{th}$ percentile volume weighted size of less than 250 nm, having film elongation of 500 to 1200%, film tensile strength of 10 to 60 mPa, an acid number value (mg KOH/g) of 5 to 40.

The size of the water dispersible resin particles is important for proper function of the inkjet print head in a similar fashion as the pigment dispersion particles. Larger particles can cause print head clogging and promote unstable or non-ejection of ink from the print head nozzles.

When measured by a laser diffraction particle sizing apparatus such as the Horiba LA-950 and the like, the volume weighted median pigment particle size is preferably less than 150 nm, more preferably less than 125 nm and most preferably less than 100 nm. Likewise, the $95^{th}$ percentile particle size is less than 250 nm, more preferably less than 200 nm and most preferably less than 100 nm.

After printing, the inkjet ink forms a film as a result of the coalescence of the ink's resin particles during contact with the substrate and subsequent drying/curing step. Such film formation has a direct impact on the "hand" or feel of the printed area. Generally, resin films with high elongation before breakage are described as having a desirable soft hand.

In addition, the elasticity as measured by percent elongation at breakage can affect how durable the printed image is when stretched or when the printed textile is laundered. If the percent elongation is too low, the printed ink can show low crack resistance, lower wash fastness, and stiff hand. If the percent elongation is too high, the ink can show poor adhesion to the textile fibers and poor wash fastness. The preferred pure resin film percent elongation at breakage is between 500 and 1200%, more preferably between 700 and 1100%.

The tensile strength of the film formed from the polymeric resin particles can directly affect the durability of the printed inkjet in on the textile substrate. If the tensile strength is less than 10 mPa or greater than 60 mPa, the wash fastness can be diminished. The preferred pure resin film tensile strength is between 10 to 60 mPa, more preferably between 10 and 35 mPa.

The acid number of the water dispersible resin particles is an essential characteristic of the polymeric resin. Acid number is the number of milligrams of potassium hydroxide required to neutralize all of the acidic sites in one gram of the dried resin. If the resin acid number is too high, there will be an excess of anionic (negatively charged) sites in the resin relative to the quantity of cationic (positively charged) sites in the pretreatment on the textile. Thus, there will be insufficient charge interaction to adequately coagulate the ink composition on the textile surface. This will result in ink penetration into the textile, and in the case of white ink low, opacity by poor coverage of the underlying dark textile.

If the acid number of the polymeric resin is too low or zero (in the case of a non-ionic resin), there will be insufficient anionic sites on the resin to interact with the pretreatment resulting in poor ink accumulation on the textile surface. Lack of ink coagulation on the textile surface can result in low print density, low white ink opacity and "punch through" or diffusion of the ink to the back side of the printed textile.

The preferred acid number for the water dispersible polymeric resin is from 5 to 40 mg KOH/g, more preferably from 5 to 20 mg KOH/g and most preferably 10 to 20 mg KOH/g.

Without limitation the anionic water dispersible polymeric resin particles may be selected from polymers classified as urethanes, acrylics, urethane-acrylic hybrids, styrene acrylics, styrene-butadienes, ethylene acrylic acids, and vinyl acrylics and mixtures thereof. The anionic water dispersible polymeric resin may further be classified as self-crosslinking or crosslinkable using crosslinking agents known in the art. Preferred polymeric resins are polyurethanes and acrylics that are self-crosslinking or capable of being crosslinked with crosslinking agents. Most preferred are polyurethane resins that are self-crosslinking or capable of being crosslinked.

According to embodiments herein, water dispersible polymeric resins which are commercially available, include without limitation, Hauthane™ series from C. L. Hauthaway & Sons Corp., Bondthane™ series from Bond Polymers, NeoRez™ and NeoCryl™ series from Royal DSM N.V., Lucidene™ and Hydriprint™ series from Hydrite Chemical Company, Acrygen series and Plextol™ R123 from Synthomer plc, Takelac™ series from Mitsui Chemicals America, Inc., AC and U series from Alberdingk Boley, Inc., R series from Essential Polymers, Texicryl™ series from Scott Bader, Ltd., Appretan™ series from Clariant, Hycar®, Hystretch®, Permax®, Lubrijet® and Sancure® series from Lubrizol Corporation, Encor® series from Arkema, Inc., Arolon® series from Reichhold, Michem® series from Michelman, Inc., RUCO-COAT®, RUCO-PUR®, and RUCO-BOND® series from Rudolf-Duraner, Joncryl® series from BASF, and Witcobond® series from LANXESS. Beetafin Series from BIP (Oldbury) Ltd., Superflex series from DKS Co. Ltd, S series from SNP, Inc., Impranil®, Baybond® and Bayhydrol® series from Covestro AG, Mowinyl series from Japan Coating Resin Co., Ltd., Sipacril series from Lamberti SpA, Rovene® Series from Mallard Creek Polymers, Hydran series from Sun Chemical®/DIC, S series from StanChem Inc., Edolan series from Tanatex Chemicals B.V. and Unithane series from Union Specialties, Inc. Preferred examples include S-1434-L, S-1428-L, and S-1426-L from SNP, Inc., Edolan SN from Tanatex Chemicals B.V. and Takelac WS-6021 from Mitsui Chemicals America, Inc.

The continuous aqueous phase comprises at least one organic solvent with a boiling point equal to or greater than 250° C. at atmospheric pressure present in an amount ranging from 15% to 40% relative to the total weight of the inkjet ink composition. The amount of the solvent can be varied depending on a variety of factors, including the properties of the solvent (solubility and/or dielectric constant), the type of colorant, and the desired performance of the resulting inkjet ink composition. The solvent preferable ranges from 15% to 35% by weight based on the total weight of the inkjet ink composition.

Examples of suitable organic solvents with boiling points at or above 250° C. include glycols (such as triethylene glycol, tetraethylene glycol, alcohols (such as triols containing from about 3 to about 40 carbon atoms such as glycerol, trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol), hydroxyethers (such as diglycerol); glycol ethers (such as triethylene glycol buty ether); tertiary alcohol amines (such as triethanolamine); lactams and lactam derivatives (such as 1-(2-hydroxyethyl)-2-pyrrolidone, and ε-caprolactam); urea or urea derivatives (such as di-(2-hydroxyethyl)-5,5,-dimethyl hydantoin); and hydroxyamide derivatives (such as N-acetylethanolamine, acetylpropanolamine, propylcarboxyethanolamine, and propylcarboxypropanolamine, as well as their reaction products with alkylene oxides). Additional examples include saccharides (such as maltitol, sorbitol, gluconolactone and maltose); and sulfone derivatives (such as sulfolane). The organic solvent can comprise mixtures of organic solvents.

Preferred water-soluble non-volatile organic compound solvents (water-soluble zero volatile organic compound solvents) with a boiling point of 250° C. or greater are selected from glycerol, diglycerol, triethylene glycol, tetraethylene glycol, 1,6-hexanediol, tripropylene glycol, triethylene glycol monobutyl ether, and 1-(2-hydroxyethyl)-2-pyrrolidone and mixtures thereof.

Surface active agents (surfactants) and dispersants may be included in the inkjet ink for textile printing. Surfactants can enhance the colloidal stability of the composition or change the interaction of the ink with either the textile substrate or with the ink print head. Various anionic, cationic, and nonionic surfactants and dispersing agents can be used in conjunction with the ink.

In one embodiment, the surfactant is present in an amount ranging from 0.05% to 5%, e.g., an amount ranging from 0.1% to 5%, or from 0.5% to 2%, by weight relative to the total weight of the inkjet ink composition.

Representative examples of anionic dispersants or surfactants include, but are not limited to, higher fatty acid salts, higher alkyidicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives.

For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids.

Salts include, for example, Na+, Li+, K+, Cs+, Rb+, and substituted and unsubstituted ammonium cations. Representative examples of cationic surfactants include aliphatic amines, quaternary ammonium salts, sulfonium salts, phosphonium salts, and the like.

Representative examples of nonionic dispersants or surfactants that can be used in ink jet inks include fluorine derivatives, silicone derivatives, siloxane derivatives, acetylene derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides.

Preferred surfactants are selected from non-ionic acetylenic type surfactants and siloxane-ethylene oxide type surfactants. More preferred surfactant examples include Surfynol 465 and Dynol 960 from Evonik Industries AG and BYK-348 from BYK-Chemie GmbH, U.S. Pat. No. 9,611,401 discloses various crosslinking agents useful in inkjet inks. The entire content of U.S. Pat. No. 9,611,401 is hereby incorporated by reference.

As used herein, the phrase "crosslinking agent" refers to a substance that promotes or regulates intermolecular covalent, ionic, hydrophobic or other form of bonding between polymer chains, linking them together to create a network of chains which result in a more elastic and/or rigid structure. Crosslinking agents, contain at least two reactive groups that can interact with respective groups present in the polymerizable constituents of the ink composition and/or on the surface of the textile fiber.

Exemplary such reactive groups include, but are not limited to, amine groups, carboxyl groups, hydroxyl groups, isocyanate groups, blocked isocyanate groups, epoxy groups, acid chloride groups, double bonds, acrylates, acrylamides, organic titanates, zirconates, and sulfhydryl groups. Crosslinking agents include homo-bifunctional crosslinking agents that have two identical reactive end groups, and hetero-bifunctional crosslinking agents which have two different reactive end groups.

These two classes of crosslinking agents differ primarily in the chemical reaction which is used to affect the crosslinking step, wherein homo-bifunctional crosslinking agents will require a one-step reaction, and hetero-bifunctional crosslinking agents may require two steps to affect the same. While homo-bifunctional crosslinking agents have the tendency to result in self-conjugation, polymerization, and intracellular crosslinking, hetero-bifunctional agents allow more controlled two step reactions, which minimizes undesirable intramolecular cross reaction and polymerization.

Crosslinking agents are further characterized by different spacer arm lengths. A crosslinking agent with a longer spacer arm may be used where two target groups are further apart and when more flexibility is desired.

Water insoluble crosslinking agents may also be dispersed into the continuous aqueous phase of the inkjet textile ink. Water insoluble crosslinking agents may be dissolved or dispersed into water immiscible solvents and emulsified into the continuous aqueous phase of the inkjet textile ink. Additionally, water miscible or water soluble crosslinking agents may be dissolved in the continuous aqueous phase of the inkjet textile ink.

Regardless of the type of crosslinking agent or how the crosslinking agent is incorporated into the inkjet textile ink, any bonding between ink and the textile fiber depends substantially on the type of fiber, or more specifically, on the physical and chemical micro-structure of the fiber surface, and the availability of reactive functional groups on the surface of the fiber, namely its chemical composition.

Cellulosic materials, such as many fabrics made at least a partially from natural fibers (cotton, hemp), wool, silk and even skin and leather, offer a variety of available and reactive functional groups such as hydroxyl, carboxyl, thiol and amine groups, which can be tethered to the ink via the crosslinking agent.

Alternatively, in cases on some fibers such as synthetic polymeric fibers, the scarcity of reactive functional groups means that the bonding of the ink to the substrate is afforded by mechanical properties and micro-structure of the fiber surface, namely affixation by polymeric adhesion and physical interweaving and entanglement.

The crosslink density of the cured inks, which constitutes the colorants attached to and encapsulated by the crosslinked polymer, stems primarily from the concentration of the crosslinking agent in the pre-polymerization mixture, which constitute the ink composition once all its parts are adjoined on the textile fiber surface. Hence, the level of crosslink density of the cured ink composition is an intermediate level which affords a highly pliable, stretchable, and elastic coating on the textile fiber surface.

Formaldehyde is a functional crosslinking agent for many polymers. However, textile inks containing formaldehyde are restricted for use in certain applications, based on formaldehyde content of the garment according to Oko-Tex Standard 100 (Oko-Tex). Although formaldehyde, which forms upon use of amino resin crosslinking agents, may evaporate from the garment at high temperatures, the levels of formaldehyde can never reach the allowed values according to the widely accepted Oko-Tex Standard 1000.

Crosslinking agents includes dialdehydes, other polyaldehydes or dialdehyde acid analogues having at least one aldehyde group, such as, for example, C2-C8 dialdehydes. Alkylated glyoxal/cyclic urea condensates serve as crosslinkers for cellulosic fibers and various active hydrogen containing polymers.

U.S. Pat. Nos. 4,285,690; 4,345,063; and 4,888,093 disclose several crosslinking agents useful in inkjet printing. The entire contents of U.S. Pat. Nos. 4,285,690; 4,345,063; and 4,888,093 are hereby incorporated by reference.

Crosslinking agents may include heteroaryl polycarbamate crosslinking agents which are based on a moiety derived from the group consisting of linear or cyclic ureas, cyanuric acid, substituted cyanuric acids, linear or cyclic amides, glycolurils, hydantoins, linear or cyclic carbamates, and mixtures thereof are suitable as crosslinker agents between the ink composition and the cellulosic fabrics.

U.S. Pat. Nos. 6,063,922; 5,596,047; and 7,381,347 and Published US Patent Application Number 2004/0116558 disclose several crosslinking agents useful in inkjet printing. The entire contents of U.S. Pat. Nos. 6,063,922; 5,596,047; and 7,381,347 and Published US Patent Application Number 2004/0116558 are hereby incorporated by reference.

Crosslinking agents may include diacetone acrylamide/hydrazine (polyalkenyl ether resins), disclosed in U.S. Pat. Nos. 5,348,997; 5,432,229; and 7,119,160, for example N-(1,1-dimethyl-3-oxobutyl)-acrylamide(DAAM)/hydrazine by Kyowa Hakko Chemical Co., Ltd., Japan. The entire contents of U.S. Pat. Nos. 5,348,997; 5,432,229; and 7,119,160 are hereby incorporated by reference.

Crosslinking agents may include carbodiimides, which are comprise of functional groups having of the formula —N=C=N— and which can react readily with amine and carboxyl groups are disclosed in European Patent Application EP0121083A1, Published US Patent Application Number 2007/0148128; U.S. Pat. Nos. 5,360,933; 6,124,398; 7,425,062; and European Patent Number EP0277361. A non-limiting example of such crosslinking agents includes CARBODILITE® by Nisshinbo Chemical Inc. The entire contents of Published US Patent Application Number 2007/

0148128; U.S. Pat. Nos. 5,360,933; 6,124,398; 7,425,062; European Patent Application EP0121083A1; and European Patent Number EP0277361 are hereby incorporated by reference.

The means to achieve the crosslinking of a prepolymer generally relies on at least one component of the starting material and/or intermediate having 3 or more functional reaction sites.

Published US Patent Application Number 2007/0060670 discloses several multifunctional monomers useful in inkjet printing. The entire content of Published US Patent Application Number 2007/0060670 is hereby incorporated by reference.

Reaction of each of the 3 (or more) reaction sites will produce a crosslinked polymer. When only two reactive sites are available on each reactive component, only linear polymers can be produced. Examples of crosslinking polymerization reactions capable of producing polyurethanes, for example, include but are not limited to the following: the isocyanate-reactive moiety has at least 3 reactive groups, for example polyfunctional amines or polyol; the isocyanate has at least 3 isocyanate groups; the prepolymer chain has at least 3 reactive sites that can react via reactions other than the isocyanate reaction, for example with amino trialkoxysilanes; addition of a reactive component with at least 3 reactive sites to the polyurethane prior to its use in the inkjet ink preparations, for example tri-functional epoxy crosslinkers; addition of a water-dispersible crosslinker with oxazoline functionality; synthesis of a polyurethane with carbonyl functionality, followed by addition of a dihydrazide compound; and any combination of the these crosslinking methods and other crosslinking means known to those of ordinary skill in the relevant art.

Blocked isocyanate crosslinkers include TMP (trimethylolpropane) adduct form or isocyanurate form of: HDI (hexamethylene diisocyanate), H6XDI (hydrogenated xylylene diisocyanate), IPDI (isophorone diisocyanate), or H12MD1 (dicyclohexylmethane diisocyanate). Additionally, the blocking agent is preferably DEM (diethyl malonate), DIPA (diisopropylamine), TRIA (1,2,4-triazole), DMP (3,5-dimethylpyrazole), or MEKO (2-butanonoxime), which, however, are not to be construed as limiting.

Crosslinking agents may include difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentylglycol diacrylate. Trifunctional acrylates include propoxylated glycerine triacrylate and ethoxylated or propoxylated trimethylolpropane triacrylate. Other higher functional acrylates include di-trimethylolpropane tetraacrylate, dipentaerythritol pentaacrylate, ethoxylated pentaeryhtitol tetraacrylate, methoxylated glycol acrylates, and acrylate esters. Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to a textile fiber surface.

Preferred crosslinking agents include the Carbodilite series from Nissinbo Chemical Inc. and Epocros series from Nippon Shokubai Co., Ltd. These crosslinking agents are highly efficient and offer good safety and low toxicity. The preferred mass ratio of crosslinking agent to anionic water dispersion polymeric resin solids is from 0.01 to 0.20, more preferably from 0.05 to 0.15.

The ink composition optionally contain one or more other ingredients, such as, buffering/neutralizing agents, adhesion promoters, bactericides, fungicides, algicides, sequestering agents, softeners, thickeners, anti-foaming agents, anti-kogation agents, corrosion inhibitors, light stabilizers, anti-curl agents, thickeners, non-reactive agents, softeners/plasticizers, specialized dispersing agents, specialized surface active agents, conductivity agents (ionizable materials) and/or other additives and adjuvants well-known in the relevant art.

pH adjusting agents include, inorganic and organic water soluble acids and inorganic and water soluble bases, and amphoteric compounds. Non-limiting examples include sodium hydroxide, potassium hydroxide, ammonium hydroxide, primary, secondary, and tertiary amines such as triethanolamine, triethylamine, dimethyl ethanolamine, 2-amino-2-methyl-1-propanol, amino acids such as tris(hydroxymethyl amino methane), hydrochloric acid, sulfuric acid, phosphoric acid, nitric acid, acetic acid, propionic acid and the like.

Non-limiting examples of anti-foaming agents (defoamer) include BYK 024, BYK 012: BYK 31 (commercially available from Byk-Chemie), FOAMEX 810, AIREX 901, AIREX 902 (commercially available from Evonik Tego Chemie GmbH, Essen, Germany), SURFYNOL DF 37, SURFYNOL DF 210, SURFYNOL DF 75 (commercially available from Air Products Ltd.), and the like.

The inkjet inks preferably have Ohnesorge number ($Oh^{-1}$) also known as the Z number values between 1 to 10, more preferably between 2 and 7. When measured at 25° C., the density of the inkjet inks is preferably between 1.00 to 2.00 grams/cm3 more preferably 1.02 to 1.20 grams/cm$^3$. The surface tension of the inkjet ink can be measured at a fixed temperature by any commonly used devices for this purpose employing methods such as a DuNouy ring tensiometer, Wilhemy plate tensiometer or bubble pressure tensiometer and the like.

When measured at 25° C., the surface tension of the inkjet inks are preferably between 15 to 60 milliNewtons/meter (mN/m), more preferably between 20 to 60 mN/m and most preferably between 25 to 50 mN/m. The viscosity of the ink jet ink can be measured at a fixed temperature by any commonly used device for this purpose employing methods such as rotating spindle viscometer for example those manufactured by Brookfield, rotating cone and plate viscometer, rolling ball viscometer, capillary viscometer and the like. When measured at 25° C., inkjet inks are preferably between 1 to 20 centipoise (cP), more preferably between 2.5 and 17.5 cP and most preferably between 2.5 and 15 cP.

For inkjet inks, it is preferred that after storage for two weeks at 60° C., the observed pH change does not exceed one pH unit, the ink viscosity change does not exceed 1 cP, the median particle size change does not exceed 10% and the 95$^{th}$ percentile particle size change does not exceed 20%.

The following examples illustrate a number of embodiments of the printing inks described above. However, it is to be understood that the following are only exemplary or illustrative of the application of the principles described above. Numerous modifications and alternative compositions, methods, and systems may be devised by those skilled in the art without departing from the spirit and scope of the printing inks described above. Thus, while the printing inks have been described above with particularity, the following examples provide further detail in connection with what are presently deemed to be the acceptable embodiments.

Pigment dispersions used in preparation of example inks are shown in Table 1.

TABLE 1

| Pigment dispersion # | Dispersion | Pigment | % Solids (by mass) |
|---|---|---|---|
| 1 | Novocolor II 8500 (Engineered Polymer Solutions) | pigment white 6 (TiO$_2$) | 66.6 |
| 2 | Tint-Ayd ® CW5003 (Chromaflow Technologies) | pigment white 6 (TiO$_2$) | 71.3 |
| 3 | Hostajet Magenta E-PT (Clariant International, Ltd.) | Pigment Red 122 | 20.0 |

Water dispersible resins used in preparation of the example inks are shown in Table 2 along with the manufacturer's information on solids content, acid number, tensile strength, and percent elongation at break. The volume weighted median particle diameter ($D_{50}$) and $95^{th}$ percentile ($D_{95}$) data were collected using a Horiba L-950 laser diffraction analyzer.

TABLE 2

| Resin # | Resin # | % solids (by mass) | Acid number (mg KOH/g) | Tensile strength (MPa) | % Elongation at break | D50 particle size (nm) | D95 particle (nm) |
|---|---|---|---|---|---|---|---|
| 1 | Edolan SN (TanatexB.V.) | 40 | 17 | 10 | 1100 | 101 | 168 |
| 2 | S-1428-L (SNP, Inc.) | 32 | 20 | 30 | 800 | 101 | 169 |
| 3 | Takelac WS-6021 (Mitsui Chemicals, Inc.) | 30 | 10-15 | 50 | 750 | 19 | 32 |
| 4 | Sancure 861 (Lubrizol Corp.) | 40 | 15 | 13.8 | 500 | 71 | 87 |
| 5 | S-1434-L (SNP, Inc.) | 35 | 16.6 | 31.1 | 900 | 31 | 38 |
| 6 | Impranil DM (Covestro AG) | 40 | 4.3 | 1 | >2000 | 184 | 301 |
| 7 | R4243 (Essential Polymers) | 33 | 25 | 14.4 | 250 | 59 | 99 |
| 8 | Beetafin BF2837 (BIP(Oldbury) Ltd.) | 60 | 5.5 | 40 | 1000 | 338 | 1074 |

Example white inks were prepared by mixing together the components shown in Table 3 and magenta inks in Table 4. Comparative example inks are shown in Table 5. The water, biocide, and water-soluble non-volatile organic compound solvents (water-soluble zero volatile organic compound solvents) first were combined first. With stirring the water dispersible polymeric resin dispersion, pigment dispersion and finally the surfactant(s) were added in that order. The ink compositions continued to mix for at least 30 min. prior to evaluation.

TABLE 3

| | Examples | | | | | |
|---|---|---|---|---|---|---|
| | 1 | 2 | 3 | 4 | 5 | 6 |
| Pigment dispersion 1 | 15.02 | 15.02 | 15.02 | 15.02 | | 15.02 |
| Pigment dispersion 2 | | | | | 14.03 | |
| Water dispersable resin 1 | 27.50 | | | | | |
| Water dispersable resin 2 | | 34.38 | | | 34.38 | 34.38 |
| Water dispersable resin 3 | | | 36.67 | | | |
| Water dispersable resin 4 | | | | 27.50 | | |
| Glycerol | 5.00 | 5.00 | 5.00 | 5.00 | 5.00 | 6.00 |
| Triethylene glycol | 21.00 | 21.00 | 21.00 | 21.00 | 21.00 | 15.00 |
| 1-(2-hydroxyethyl)-2-pyrrolidone | | | | | | 5.00 |
| 1,6-hexanediol | | | | | | 0.50 |
| Proxel GXL | 0.02 | 0.02 | 0.02 | 0.02 | 0.02 | 0.02 |
| BYK-348 | | | | | | 0.50 |
| Surfynol 465 | | | | | | 0.25 |
| Dynol 960 | 1.00 | 1.00 | 1.00 | 1.00 | 1.00 | |
| Water | 30.46 | 23.58 | 21.29 | 30.46 | 24.57 | 23.33 |
| Total | 100.00 | 100.00 | 100.00 | 100.00 | 100.00 | 100.00 |
| Percent total organic solvents | 26.00 | 26.00 | 26.00 | 26.00 | 26.00 | 26.50 |
| ink viscosity @ 25 °C (cp) | 6.8 | 7.45 | 8.6 | 8.3 | 9.0 | 8.0 |

TABLE 3-continued

| | Examples | | | | | |
|---|---|---|---|---|---|---|
| | 1 | 2 | 3 | 4 | 5 | 6 |
| L* | ● | ● | ○ | ● | ● | ○ |
| ΔL* after 3 wash cycles | ○ | ● | ○ | ○ | ● | ● |
| punch-through | ● | ● | ● | ● | ● | ● |

TABLE 4

| | Examples | |
|---|---|---|
| Pigment dispersion 3 | 20.00 | 20.00 |
| water dispersable resin 5 | 18.57 | 18.57 |
| Glycerol | 6.00 | 10.00 |
| Triethylene glycol | 27.50 | 15.00 |
| 1-(2-hydroxyethyl)-2-pyrrolidone | | 5.00 |
| 1,6-hexanediol | | 0.5 |
| Proxel GXL | 0.02 | 0.02 |
| BYK-348 | 0.25 | 0.25 |
| Water | 27.66 | 30.66 |
| Total | 100.00 | 100.00 |
| Percent total organic solvents | 33.50 | 30.50 |
| ink viscosity @ 25° C. (cp) | 4.7 | 4.2 |

TABLE 5

| | Comparative Examples | | | | |
|---|---|---|---|---|---|
| | 1 | 2 | 3 | 4 | 5 |
| Pigment dispersion 1 | 15.02 | 15.02 | 21.02 | 21.02 | |
| Water dispersable resin 1 | 27.50 | 27.50 | | | |
| Water dispersable resin 6 | | | 27.5 | | |
| Water dispersable resin 7 | | | | 33.33 | |
| Water dispersable resin 8 | | | | | 18.33 |
| Glycerol | 5.00 | 5.00 | 5.00 | 5.00 | 5.00 |
| Triethylene glycol | 5.00 | 40.00 | 21.00 | 21.00 | 21.00 |
| 1-(2-hydroxyethyl)-2-pyrrolidone | | | | | |
| 1,6-hexanediol | | | | | |
| Proxel GXL | 0.02 | 0.02 | 0.02 | 0.02 | 0.02 |
| BYK-348 | | | | | |
| Surfynol 465 | | | | | |
| Dynol 960 | 1.00 | 1.00 | 1.00 | 1.00 | 1.00 |
| Water | 46.46 | 11.46 | 24.46 | 18.63 | 54.65 |
| Total | 100.00 | 100.00 | 100.00 | 100.00 | 100.00 |
| Percent total organic solvents | 10.00 | 45.00 | 26.00 | 26.00 | 26.00 |
| ink viscosity @ 25° C. (cp) | 4.1 | 13.6 | 7.3 | 6.3 | 5.3 |
| L* | Δ | ● | x | x | x |
| ΔL* after 3 wash cycles | x | ● | x | ○ | ● |
| punch-through | ● | ● | ● | ● | x |

Ink viscosity was measure with a Brookfield DV3T viscometer using a small volume adapter, SC4-18 spindle, with a rotation speed of 180 rpm. Ink temperature during measurement was controlled via an external temperature bath supplying tempered water through the external jacket of the small volume adapter. The acceptable viscosity range at 25° C. for the inks is between 4 and 13 centipoise (cP).

The textile for white ink evaluation was Gildan® Heavy Cotton 100% cotton black T-shirt material. The textile was pretreated with Firebird FBX100™ Universal pretreatment at approximately 16-19 mg/cm² wet coverage and subsequently dried for a minimum of 24 hours.

To enable rapid evaluation, the white inks of examples 1 through 6, in Table 3, and comparative examples 1 through 5, in Table 5, were uniformly deposited onto the textile substrate using a hand held NEO gravity feed dual action airbrush (manufactured by ANEST Iwata-Medea, Inc). The air supply to the air brush was set at 15 psig.

A premeasured amount of ink was placed in the air brush reservoir sufficient to give the desired mass of ink onto the textile substrate when the reservoir reached empty. Prior to spraying white ink, the textile substrate was weighed.

A plastic film template with a two inch square opening was placed on top of the textile substrate to permit uniform ink deposition and to control overspray. The target amount of liquid ink was controlled at 31±1 mg/cm². After depositing the white ink, the substrate was again weighed to verify the correct mass of wet ink was deposited. After spraying, the textile sample with ink was placed in a lab convection oven set at 166° C. for 4 minutes to dry and cure the ink.

Post curing the lightness value (CIELab L*) of the white ink on black textile was measured by a PIAS II hand held spectrophotometer (manufactured by Quality Engineering Associates, Inc). The largest aperture was used, illuminant set at D5000, and 2' observer angle. Evaluation standards in Table 3 and Table 5 are: ●—L*>94, excellent, ○—L*93.5 to 94, good, Δ—93.0 to 93.5—fair (unsatisfactory), x—less than 93—poor.

A qualitative assessment of white ink penetration to the back side of the spray printed textile is called punch-through. It describes whether the ink-pretreatment interaction is sufficiently strong enough to arrest the ink on the printed surface of the textile rendering good white ink or color ink intensity. Evaluation standards in Table 3 and Table 5 are: ●—none, excellent, ○—barely noticeable, good, Δ—slight to some punch-through, fair (unsatisfactory), x—significant punch-through—poor.

To assess wash fastness for the white inks, the spray printed samples were pinned to a white cotton T-shirt and loaded in a top loading compact washer. In addition, ten 100% cotton T-shirts were also placed in the washer along with the test samples. A single Tide detergent pod (Original 3 in 1 Tide Pods, Proctor & Gamble Co.) was placed in the washer at the start of the cycle. The normal wash temperature setting was used.

After the garment with the attached ink test prints along with the additional T-shirts were washed, the garment with the attached ink test prints along with the additional T-shirts were placed in a compact dryer and dried under normal settings.

After drying, the L* value for each white ink was re-measured. The change in L* lightness value (ΔL*) was recorded after three wash and dry cycles. Deterioration of the white ink causes the black textile underneath to become visible, thus resulting in a decrease in L* and a negative value for ΔL*. Evaluation standards in Table 3 and Table 5 are: ●—ΔL*>-1, excellent, ○—ΔL*-7 to -1, good, Δ—ΔL*-15 to -7—fair (unsatisfactory), x—ΔL* less than -15—poor.

The example magenta inks in Table 4 are illustrative of the ability to formulate non-white inks with water-soluble non-volatile organic compound solvents (water-soluble zero volatile organic compound solvents) within the preferred weight percent range in the ink while maintaining the required ink viscosity.

Inspection of the results from Table 3 and Table 5 illustrates that the inks have viscosity values that fall within the preferred range and perform well for all of the stated evaluation criteria whereas the comparative examples either have viscosity values outside the required range or provide poor performance against the evaluation criteria.

With respect to the inks described above, the inks can be used to print images on textiles.

Figure 1:
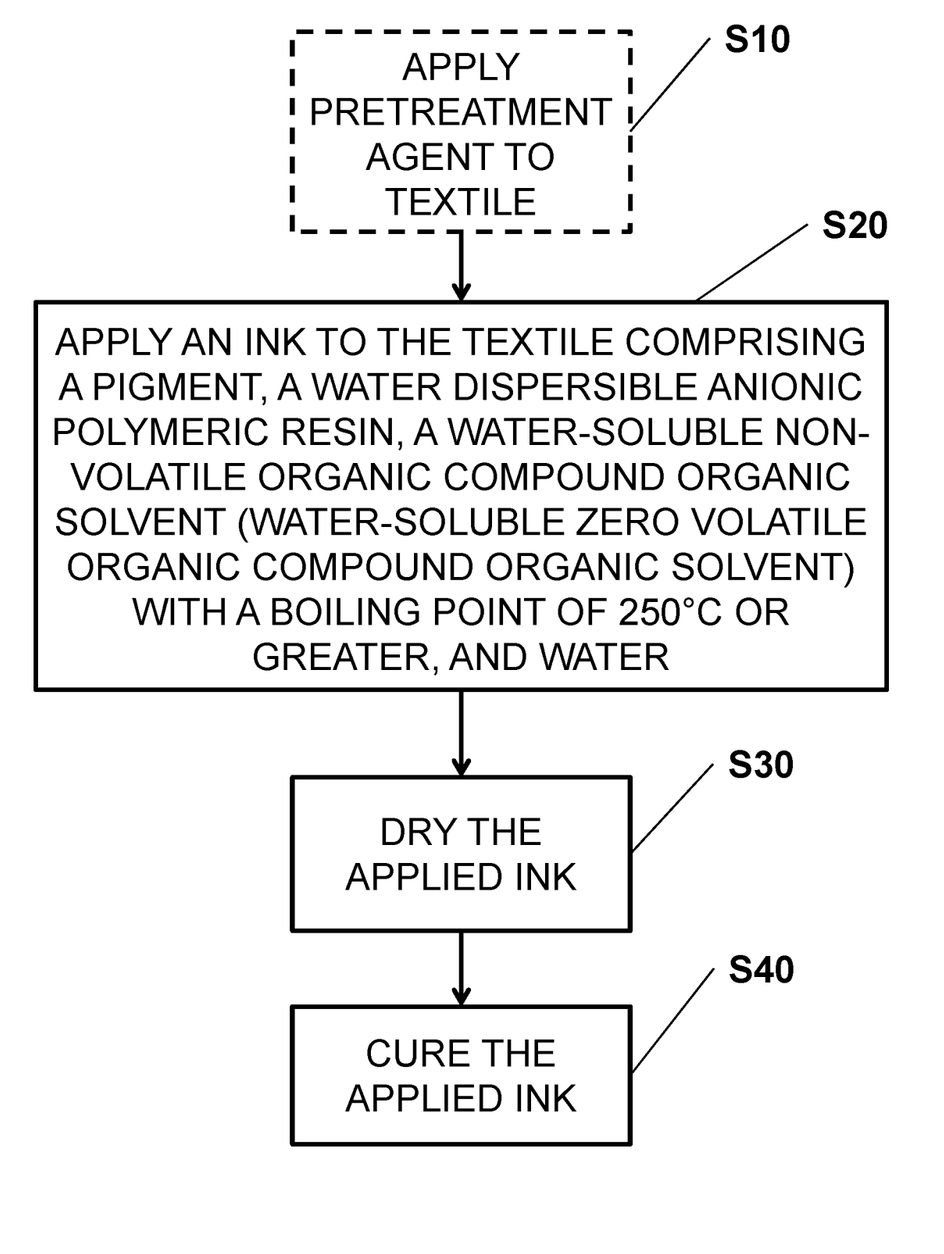
FIG. 1 shows a flowchart of a textile printing process.

For example, as illustrated in FIG. 1, an image, at step S20, can be formed on a textile item by applying an ink comprising a pigment; a water dispersible anionic polymeric resin; a water-soluble non-volatile organic compound solvent (water-soluble zero volatile organic compound solvent) with a boiling point of 250° C. or greater; and water; the water dispersible polymeric resin particles having a median volume weighted size of less than 150 nm, a $95^{th}$ percentile volume weighted size of less than 250 nm, a resin film elongation of 500 to 1200%, a film tensile strength of 10 to 60 mPa. The applied ink, at step S30, is dried, and the applied ink, at step S40, is cured.

The ink may further include a polymeric resin crosslinking agent.

The ink can be applied using conventional inkjet processes capable of printing upon a textile item or conventional inkjet printers capable of printing upon a textile item.

The ink can be dried and/or cured using conventional drying and/or curing processes and/or equipment capable of drying and/or curing an ink upon a textile item.

Moreover, as illustrated by FIG. 1, the textile item, as step S10, may, optionally, be pre-treated with a pretreatment agent comprising a polyvalent metal salt to a printing location on the textile item to be printed.

In summary, an ink, having a viscosity of 2.5 to 15 centipoise at 25° C., for textile printing comprises a pigment; a water dispersible anionic polymeric resin; a water-soluble non-volatile organic compound solvent (water-soluble zero volatile organic compound solvent) with a boiling point of 250° C. or greater; and water; the water dispersible polymeric resin particles having a median volume weighted size of less than 150 nm and a $95^{th}$ percentile volume weighted size of less than 250 nm, the water dispersible polymeric resin having an acid number value of 5 to 40, a resin film elongation of 500 to 1200%, and a film tensile strength of 10 to 60 mPa.

The parts by weight of the pigment may be 1 to 20 of the ink.

The parts by weight of the water dispersible anionic polymeric resin may be 3 to 25 of the ink.

The parts by weight of the water-soluble non-volatile organic compound solvent (water-soluble zero volatile organic compound solvent) may be 15 to 40 of the ink.

The ink may also include a crosslinking agent.

The parts by weight of the crosslinking agent may be 1 to 5 of the ink.

The water dispersible anionic polymeric resin may be a polyurethane resin.

The water-soluble non-volatile organic compound solvent (water-soluble zero volatile organic compound solvent) may be selected from glycerol, diglycerol, triethylene glycol, tetraethylene glycol, 1,6-hexanediol, tripropylene glycol, triethylene glycol monobutyl ether, and 1-(2-hydroxyethyl)-2-pyrrolidone.

The water dispersible anionic polyurethane resin may comprise aliphatic, polyester, polyether, hydroxyalkyl, silane, and/or polycarbonate segments.

The crosslinking agent may be a carbodiimide and/or a polyoxazoline.

A method of printing an image on a textile comprises (a) applying an ink to a printing location onto a textile, the ink having pigment, a water dispersible anionic polymeric resin, a water soluble zero volatile organic compound solvent with a boiling point of 250° C. or greater, and water, the water dispersible anionic polymeric resin having particles with a median volume weighted size of less than 150 nm and a $95^{th}$ percentile volume weighted size of less than 250 nm, the water dispersible anionic polymeric resin having an acid number value of 5 to 40, a resin elongation of 500 to 1200%, and a film tensile strength of 10 to 60 mPa; (b) drying the applied ink; and (c) curing the applied ink.

The method may further comprise pretreating, with a pretreatment agent, the printing location on the textile.

The pretreatment agent may include a polyvalent metal salt.

The parts by weight of the pigment may be 1 to 20 of the ink.

The parts by weight of the water dispersible anionic polymeric resin may be 3 to 25 of the ink.

The parts by weight of the water soluble zero volatile organic compound solvent may be 15 to 40 of the ink.

The water dispersible anionic polymeric resin may be a polyurethane resin.

The water soluble zero volatile organic compound solvent may be selected from glycerol, diglycerol, triethylene glycol, tetraethylene glycol, 1,6-hexanediol, tripropylene glycol, triethylene glycol monobutyl ether, and 1-(2-hydroxyethyl)-2-pyrrolidone.

The water dispersible anionic polyurethane resin may comprise aliphatic, polyester, polyether, hydroxyalkyl, silane, and/or polycarbonate segments.

The crosslinking agent may be a carbodiimide and/or a polyoxazoline.

A printed textile, comprising textile fabric; and an ink formed on said textile fabric; the ink including pigment, a water dispersible anionic polymeric resin, a water soluble zero volatile organic compound solvent with a boiling point of 250° C. or greater, and water, the water dispersible anionic polymeric resin having particles with a median volume weighted size of less than 150 nm and a $95^{th}$ percentile volume weighted size of less than 250 nm, the water dispersible anionic polymeric resin having an acid number value of 5 to 40, a resin elongation of 600 to 1200%, and a film tensile strength of 10 to 60 mPa.

The parts by weight of the pigment may be 1 to 20 parts of the ink, parts by weight of the water dispersible anionic polymeric resin may be 3 to 25 parts of the ink, and parts by weight of the water soluble zero volatile organic compound solvent may be 15 to 40 parts of the ink. The ink may include a crosslinking agent. The water soluble zero volatile organic compound solvent may be selected from glycerol, diglycerol, triethylene glycol, tetraethylene glycol, 1,6-hexanediol, tripropylene glycol, triethylene glycol monobutyl ether, and 1-(2-hydroxyethyl)-2-pyrrolidone.

A method of printing an image on a textile comprises (a) applying a first ink to a printing location onto a textile, the first ink having a first pigment, a water dispersible anionic polymeric resin, a water soluble zero volatile organic compound solvent with a boiling point of 250° C. or greater, and water, the water dispersible anionic polymeric resin having particles with a median volume weighted size of less than 150 nm and a 95$^{th}$ percentile volume weighted size of less than 250 nm, the water dispersible anionic polymeric resin having an acid number value of 5 to 40, a resin elongation of 500 to 1200%, and a film tensile strength of 10 to 60 mPa, the first pigment being a TiO$_2$ pigment; (b) applying a second ink onto the textile, the second ink having a second pigment, a water dispersible anionic polymeric resin, a water soluble zero volatile organic compound solvent with a boiling point of 250° C. or greater, and water, the water dispersible anionic polymeric resin having particles with a median volume weighted size of less than 150 nm and a 95$^{th}$ percentile volume weighted size of less than 250 nm, the water dispersible anionic polymeric resin having an acid number value of 5 to 40, a resin elongation of 500 to 1200%, and a film tensile strength of 10 to 60 mPa, the second pigment being different from the first pigment; (c) drying the applied ink; and (d) curing the applied ink.

The method may apply the first ink before the second ink is applied.

The method may pretreat, before applying the inks, with a pretreatment agent, the printing location on the textile. The pretreatment agent may include a polyvalent metal salt.

The parts by weight of the pigment may be 1 to 20 of the first ink. The parts by weight of the water dispersible anionic polymeric resin may be 3 to 25 of the first ink. The parts by weight of the water soluble zero volatile organic compound solvent may be 15 to 40 of the first ink.

The parts by weight of the pigment may be 1 to 20 of the second ink. The parts by weight of the water dispersible anionic polymeric resin may be 3 to 25 of the second ink. The parts by weight of the water soluble zero volatile organic compound solvent may be 15 to 40 of the second ink.

The water dispersible anionic polymeric resin may be a polyurethane resin.

The water soluble zero volatile organic compound solvent may be selected from glycerol, diglycerol, triethylene glycol, tetraethylene glycol, 1,6-hexanediol, tripropylene glycol, triethylene glycol monobutyl ether, and 1-(2-hydroxyethyl)-2-pyrrolidone.

The water dispersible anionic polyurethane resin may include aliphatic, polyester, polyether, hydroxyalkyl, silane, and/or polycarbonate segments.

The crosslinking agent may be a carbodiimide and/or a polyoxazoline.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method of printing an image on a textile comprising:
   (a) applying an ink onto a printing location on a textile, the ink having pigment, a water dispersible anionic polymeric resin, a water soluble zero volatile organic compound solvent with a boiling point of 250° C. or greater, and water, the water dispersible anionic polymeric resin having particles with a median volume weighted size of less than 150 nm and a 95$^{th}$ percentile volume weighted size of less than 250 nm, the water dispersible anionic polymeric resin having an acid number value of 5 to 40, a resin elongation of 500 to 1200%, and a film tensile strength of 10 to 60 mPa;
   (b) drying the applied ink; and
   (c) curing the applied ink.

2. The method as claimed in claim 1, further comprising:
   (d) pretreating, before applying the ink, with a pretreatment agent, the printing location on the textile; and
   (e) applying a white opaque ink, before applying the ink and after applying the pretreatment agent, to the pretreated printing location on the textile.

3. The method as claimed in claim 2, wherein the pretreatment agent includes a polyvalent metal salt.

4. The method as claimed in claim 1, wherein parts by weight of the pigment is 1 to 20 of the ink, parts by weight of the water dispersible anionic polymeric resin is 3 to 25 of the ink, and parts by weight of the water soluble zero volatile organic compound solvent is 15 to 40 of the ink.

5. The method as claimed in claim 1, wherein the water dispersible anionic polymeric resin is a polyurethane resin.

6. The method as claimed in claim 5, wherein the water dispersible anionic polyurethane resin comprises aliphatic, polyester, polyether, hydroxyalkyl, silane, and/or polycarbonate segments.

7. The method as claimed in claim 1, wherein the water soluble zero volatile organic compound solvent is selected from glycerol, diglycerol, triethylene glycol, tetraethylene glycol, 1,6-hexanediol, tripropylene glycol, triethylene glycol monobutyl ether, and 1-(2-hydroxyethyl)-2-pyrrolidone.

8. The method as claimed in claim 1, wherein the crosslinking agent is a carbodiimide and/or a polyoxazoline.

9. A method of printing an image on a textile comprising:
   (a) applying a first ink onto a printing location on a textile, the first ink having a first pigment, a water dispersible anionic polymeric resin, a water soluble zero volatile organic compound solvent with a boiling point of 250° C. or greater, and water, the water dispersible anionic polymeric resin having particles with a median volume weighted size of less than 150 nm and a 95$^{th}$ percentile volume weighted size of less than 250 nm, the water dispersible anionic polymeric resin having an acid number value of 5 to 40, a resin elongation of 500 to 1200%, and a film tensile strength of 10 to 60 mPa, the first pigment being a TiO$_2$ pigment;
   (b) applying a second ink onto the textile, the second ink having a second pigment, a water dispersible anionic polymeric resin, a water soluble zero volatile organic compound solvent with a boiling point of 250° C. or greater, and water, the water dispersible anionic polymeric resin having particles with a median volume weighted size of less than 150 nm and a 95$^{th}$ percentile volume weighted size of less than 250 nm, the water dispersible anionic polymeric resin having an acid number value of 5 to 40, a resin elongation of 500 to 1200%, and a film tensile strength of 10 to 60 mPa, the second pigment being different from the first pigment;
   (c) drying the applied ink; and
   (d) curing the applied ink.

10. The method as claimed in claim 9, wherein the first ink is applied before the second ink is applied.

11. The method as claimed in claim 9, further comprising:
    (e) pretreating, before applying the inks, with a pretreatment agent, the printing location on the textile.

12. The method as claimed in claim 11, wherein the pretreatment agent includes a polyvalent metal salt.

13. The method as claimed in claim 9, wherein parts by weight of the pigment is 1 to 20 of the first ink, parts by weight of the water dispersible anionic polymeric resin is 3 to 25 of the first ink, and parts by weight of the water soluble zero volatile organic compound solvent is 15 to 40 of the first ink.

14. The method as claimed in claim 13, wherein parts by weight of the pigment is 1 to 20 of the second ink, parts by weight of the water dispersible anionic polymeric resin is 3 to 25 of the second ink, and parts by weight of the water soluble zero volatile organic compound solvent is 15 to 40 of the second ink.

15. The method as claimed in claim 9, wherein parts by weight of the pigment is 1 to 20 of the second ink, parts by weight of the water dispersible anionic polymeric resin is 3 to 25 of the second ink, and parts by weight of the water soluble zero volatile organic compound solvent is 15 to 40 of the second ink.

16. The method as claimed in claim 9, wherein the water dispersible anionic polymeric resin is a polyurethane resin.

17. The method as claimed in claim 16, wherein the water dispersible anionic polyurethane resin comprises aliphatic, polyester, polyether, hydroxyalkyl, silane, and/or polycarbonate segments.

18. The method as claimed in claim 9, wherein the water soluble zero volatile organic compound solvent is selected from glycerol, diglycerol, triethylene glycol, tetraethylene glycol, 1,6-hexanediol, tripropylene glycol, triethylene glycol monobutyl ether, and 1-(2-hydroxyethyl)-2-pyrrolidone.

19. The method as claimed in claim 9, wherein the crosslinking agent is a carbodiimide and/or a polyoxazoline.

* * * * *